United States Patent [19]

Ginnow et al.

[11] Patent Number: 4,503,993
[45] Date of Patent: Mar. 12, 1985

[54] APPARATUS FOR FEEDING LOOSE FASTENERS TO A PLURALITY OF FASTENING MACHINES

[76] Inventors: Oscar H. Ginnow; Roger H. Ginnow, both of Hopbrook Rd., Bethany, Conn. 06525

[21] Appl. No.: 463,231

[22] Filed: Feb. 2, 1983

[51] Int. Cl.³ .............................................. B65G 57/16
[52] U.S. Cl. ....................................... 221/10; 227/117
[58] Field of Search ....................... 227/117, 112, 1, 2; 221/165, 10, 11, 177, 182, 175; 198/358, 360

[56] References Cited

U.S. PATENT DOCUMENTS 2,856,606 10/1958 Richards ......................... 227/117 X
2,879,509 3/1959 Congdon et al. ................ 227/130 X
3,430,808 3/1969 Matthews .............................. 221/10

Primary Examiner—Stanley H. Tollberg
Attorney, Agent, or Firm—Delio & Associates

[57] ABSTRACT

An apparatus for feeding loose fasteners, such as nails or screws, from the output guideway of a sorter to a plurality of fastening machines. A plurality of holding guideways for holding a quantity of fasteners to be sequentially fed to each fastening machine are attached to an actuator capable of positioning each holding guideway in alignment with the output guideway of the sorter to enable fasteners to be fed into each holding guideway. As each fastener reaches the output end of the holding guideway, it is temporarily retained at that position before it is transmitted to its respective fastening machine for use.

18 Claims, 7 Drawing Figures

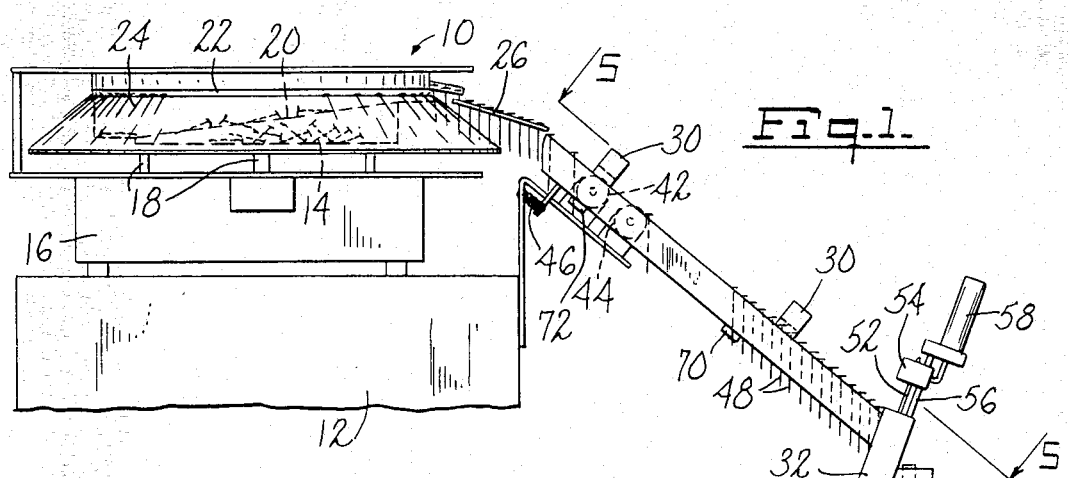

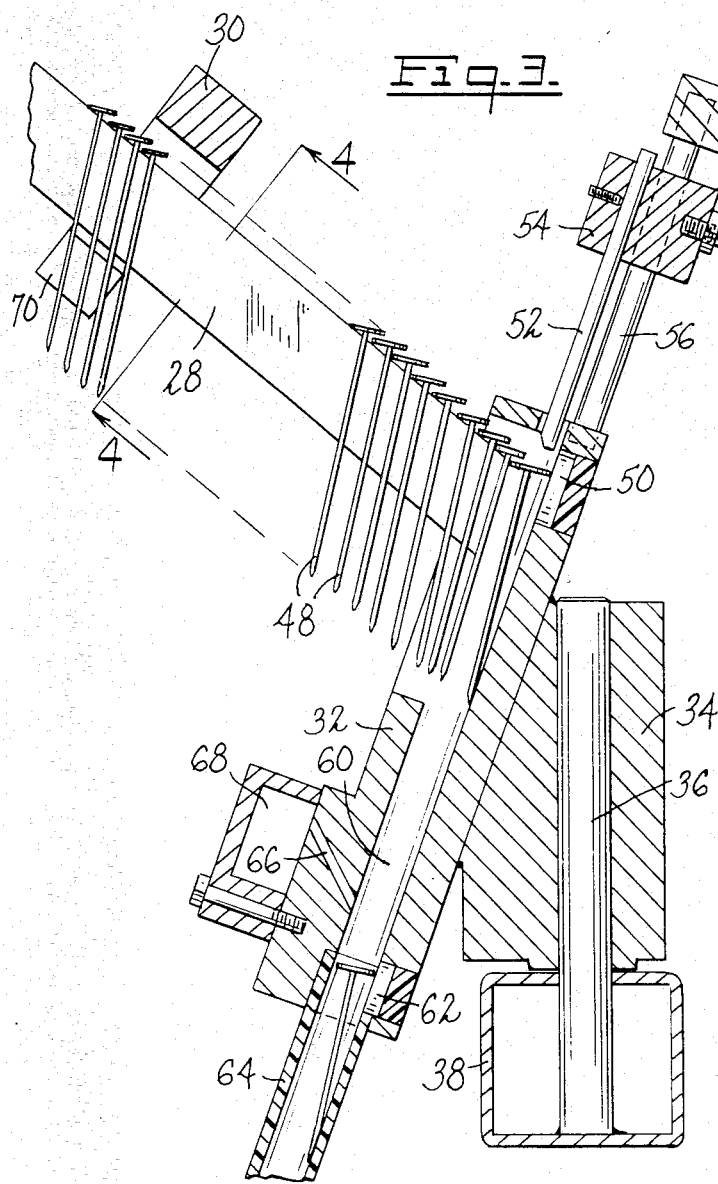
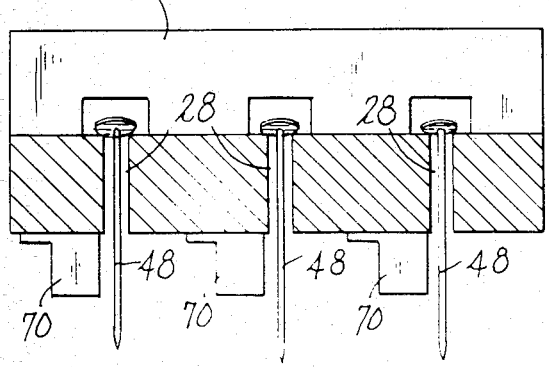
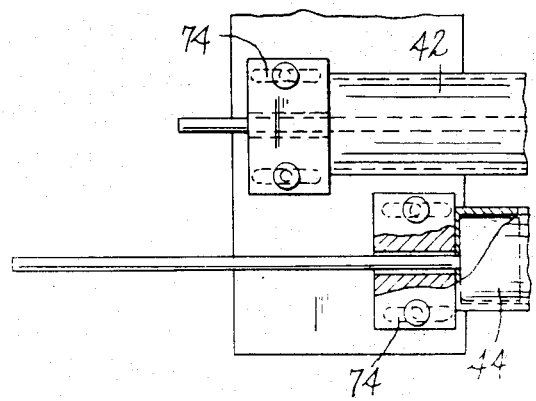

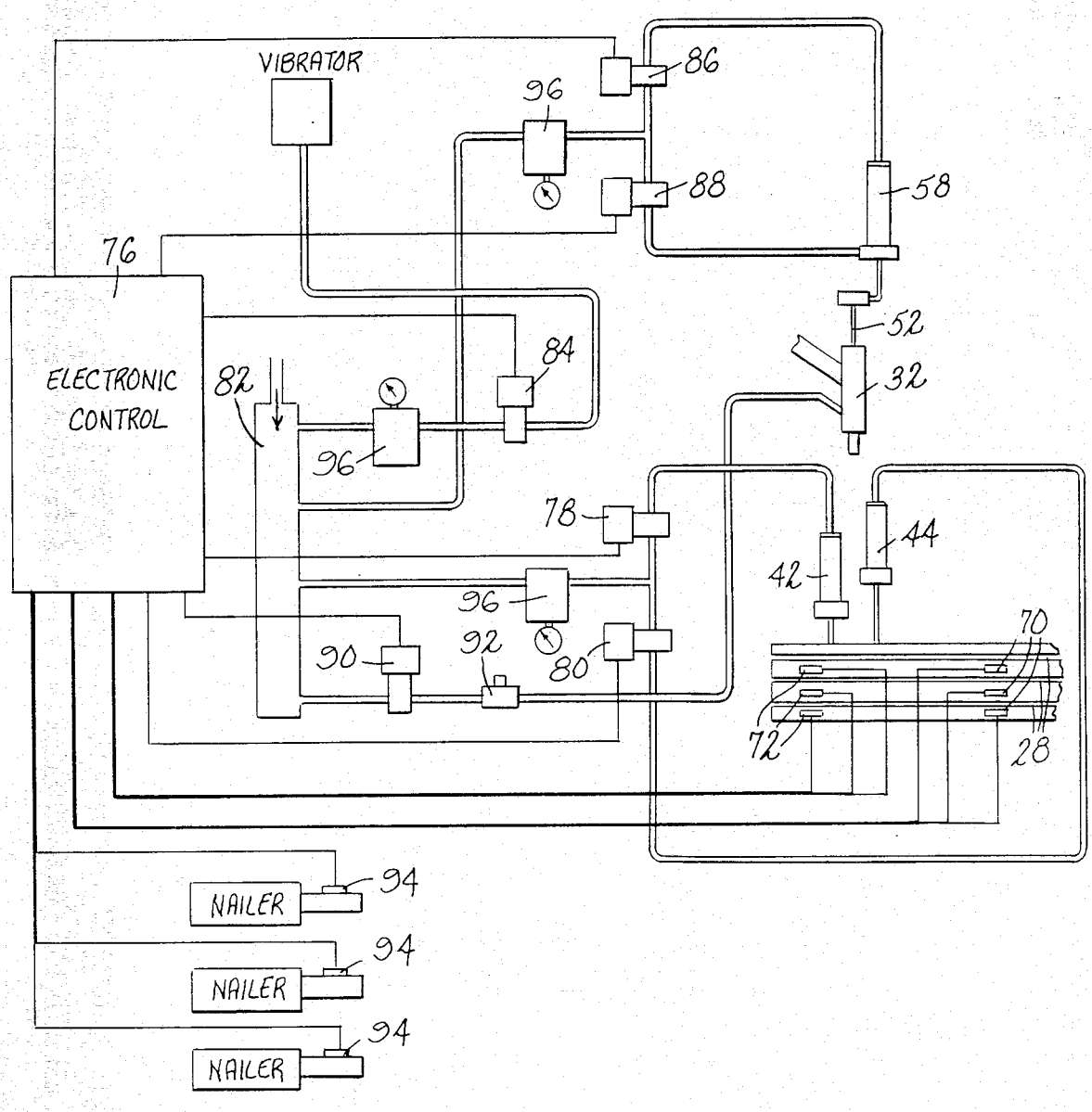

APPARATUS FOR FEEDING LOOSE FASTENERS TO A PLURALITY OF FASTENING MACHINES

BACKGROUND OF THE INVENTION

1. Field of the Invention

This invention relates to an apparatus for feeding loose fasteners with heads, such as nails or screws, from a sorter to a plurality of fastening machines. The loose fasteners are dumped into the input hopper of a sorter where they are sorted and aligned. They are then fed in the proper orientation and at the proper time to the appropriate fastening machine. This invention is especially suited for feeding nails to a plurality of nailing machines such as are described in the applicant's copending application Ser. No. 376,014 filed May 7, 1982.

The invention contemplates the use of a sorter having a single input hopper wherein a large quantity of loose fasteners can be placed in random orientation. The sorted and aligned fasteners are temporarily stored and then fed via pneumatic transfer tubes to several fastening machines in the proper orientation and at the proper time to be used by the fastening machines. This invention is particularly useful in automatic nailing operations such as in the production of wooden pallets, where automatic nailers are operating simultaneously at several positions.

2. Description of the Prior Art

The prior art shows numerous designs for nailing machines and associated feeders for them. Typically, there is a single feeder for each such machine. The earliest designs did not use loose nails, but rather fed them from a nail supply magazine. Later designs were capable of using loose nails, which simplified the loading process. An example of a loose nail feeder single nailing machine can be seen in U.S. Pat. No. 2,879,509. This design is satisfactory where the nailing machine is operated manually and independently from other nailers. However, this design creates a problem where multiple nailing machines are operating automatically, performing automatic nailing operations at a number of remote locations under central control, because the operator must check each remote location to determine that the nailing machine located there has an adequate supply of nails.

In this type of operation, because the nailers are controlled from a central location, the remote nailers will normally be operating without the direct supervision of an operator. If one nailing machine was to exhaust it supply of nails, the resulting product would be improperly nailed. In the production of wooden pallets, for example, each wooden member has a plurality of nails holding it in position and consequently, this improper nailing might not be immediately noticed.

The present invention utilizes a sorter having a single hopper feeding all of the fastening machines, which can be located at the central control unit controlling all the automatic fastening machines, and therefore, requires less individual attention to monitor. This minimizes the effort required by the operator to ensure that all fastening machines are being properly fed, and maximizes the likelihood that the automatic fastening operation will continue to run without interruption.

A further advantage of this design is that some expensive components (for example the sorter) which would be required in each individual feeder, can be shared and used to feed multiple fastening machines. In the prior art, one such component would be required for each fastening machines. This provides a savings in overall cost as compared to having a single feeder for each such machine. Other advantages such as decreased maintenance and centralized control over the nail feeding operation are readily apparent.

BRIEF SUMMARY OF THE INVENTION

The present invention is an apparatus for feeding loose fasteners with heads such as nails or screws to a plurality of fastening machines. The fasteners may be dumped into the hopper of the sorter where they are sorted from their initial, randomly-oriented state in the hopper to a sequentially presented and uniformly oriented state on the output guideway of the sorter. A sorter such as is described above is well known in the art and is commercially available.

Properly oriented fasteners are then fed from the output guideway of the sorter to any one of several holding guideways. Each holding guideway holds a reservoir of fasteners to be fed to an individual fastening machine.

The holding guideways are pivotally mounted to enable each holding guideway to be moved into alignment with the single output guideway of the sorter. Sensors mounted on the holding guideways sense the presence or absence of a sufficient quantity of fasteners on each holding guideway, and a control unit correctly positions the holding guideways in alignment with the sorter output guideway and controls the output of the sorter to feed fasteners into each holding guideway so as to maintain more than a predetermined minimum quantity of fasteners in the reservoir of fasteners on each holding guideway.

As fasteners arrive at the output end of each holding guideway, they are temporarily held by a first magnet. A plunger located above them, at a signal from a central control unit, pushes them downward into a holding chamber where they are held in the ready position by a second magnet.

The holding chamber is connected to a pneumatic transfer tube. When compressed air is fed into the holding chamber at a signal from the control unit, the fastener is forced away from the fastening machine. Fasteners can be fed to fastening machines mounted in any position, and even to fastening machines located higher than the feeder due to the use of the compressed air delivery system.

One object of the present invention is to provide a new and improved fastener feeding machine which can sort loose fasteners and feed them to a multitude of fastening machines.

An additional object of the invention is to provide a new and improved fastener feeding medium with a single input hopper for fasteners to minimize operator attention in an automatic fastening operation and to ensure that all fastening machines have an adequate supply of fasteners.

An additional object of the invention is to provide a new and improved fastener feeding machine which can feed fasteners to fastening machines located at remote locations and positioned in any attitude or at any height relative to the feeder.

An additional object of the invention is to provide a new and improved feeding machine which can simultaneously feed a single fastener to each of a plurality of fastener feeding machines at a single command.

BRIEF DESCRIPTION OF THE DRAWINGS

FIG. 1 is a side elevational view of the preferred embodiment of the invention.

FIG. 2 is a perspective view of the preferred embodiment of the invention, excluding the sorter.

FIG. 3 is a vertical sectional view through a portion of the preferred embodiment of the invention in the vicinity of the holding chamber.

FIG. 4 is a sectional view taken along line 4—4 of FIG. 3.

FIG. 5 is a sectional view taken along line 5—5 of FIG. 1 showing the holding guideways.

FIG. 6 is a detailed view partially in section of the pneumatic actuators used to position the holding guideways.

FIG. 7 is a block diagram of the electronic and hydraulic control system of the present invention.

DETAILED DESCRIPTION OF THE INVENTION

FIG. 1 shows the preferred embodiment of the present invention in an elevational side view. FIG. 2 shows a perspective view of the invention, but does not show the sorter. In the preferred embodiment of this invention, and in its most common application, the invention is used to feed nails to a plurality of automatic nailing machines. The invention is particularly well adapted for use in feeding automatic nailers in the construction of wooden pallets.

In this type of operation, each wooden member of the pallet is simultaneously nailed at a number of points. Consequently, the automatic nailers operate simultaneously in a synchronized manner, and each nailer must be fed a single nail at the same time that every other nailer is fed a single nail.

Therefore, this detailed description and the drawings will refer only to nails and nailing machines. The invention is, of course, equally suitable for use with other forms of headed fasteners. Furthermore, in the preferred embodiment which is shown in the drawings, the invention is suited for use in the application described above, wherein a single nail is simultaneously fed to each nailing machine. All of the nailing machines then operate simultaneously and then another nail is fed to each machine. Minor changes in the design would enable one skilled in the art to adapt the preferred embodiment for use as a feeder which can feed nails to nailing machines which operate independently rather than simultaneously. Although not shown in the drawings, the points where such changes must be made to allow the nailers to be fed independently will be indicated in the description to follow.

Referring to FIG. 1, a sorter 10 is mounted on the base 12 of the present invention. Sorters such as the one illustrated are commercially available and are well known in the art. Loose nails 14 are placed in the input hopper of the sorter. The base of the sorter 16 contains a means for vibrating the input hopper of the sorter. In the preferred embodiment, the vibration is accomplished by pneumatic means, however, it may just as easily be accomplished by an electrical or hydraulic vibrator. The vibrations are transferred from the base 16 to the loose nails 14 in the input hopper through legs 18. The vibration causes loose nails 14 to be carried up inclined ramp 20 located on the interior of the input hopper. As the nails reach the upper end of inclined ramp 20, the body of the nail drops through slot 22 where it remains suspended by its head. Uniformly oriented nails 24 are carried around the exterior of the input hopper by means of the vibratory action until they reach the sorter output track 26.

Referring to FIG. 2, the sorter output track 26 can be seen with a quantity of nails suspended by their heads located in the output track. Mounted below the sorter output track 26 are three nail holding tracks 28. While the preferred embodiment has three nail holding tracks 28, as many tracks as are desired can be used to supply an equal number of nailing machines. The nail holding tracks 28 are held in a spaced relationship by support members 30 and by mounting member 32. Mounting member 32 is in turn mounted on support block 34 which pivots on rod 36 mounted on the feeder frame 38.

Nail holding tracks 28 present a curved surface 40 at their input end with a radius set by its distance from the axis of pivot on rod 36. This prevents gaps from appearing which might cause jamming as the nail holding tracks 28 are pivoted into alignment with the sorter output track 26.

Nail holding tracks 28 are biased toward pneumatic actuators 42 and 44 by a spring 46. The spring 46 holds the nail holding tracks 28 against the output arms of the pneumatic actuators. When compressed air is fed into a pneumatic actuator, the output arms extend stretching the spring 46 and pivoting the holding tracks 28 on rod 36 so as to position them in alignment with the sorter output track 26 which enables nails to be fed into the holding tracks 28. As the compressed air is released from the pneumatic actuator, spring 46 pushes the output arm of the pneumatic actuator back into its retracted position.

In the preferred embodiment with three holding tracks 28, there are two pneumatic actuators 42 and 44. These actuators are mounted in an offset manner and position the output track 28 in the following manner. With no compressed air applied to either pneumatic actuator, spring 46 forces the output arm of pneumatic actuator 42 into the fully retracted position where it then functions as a stop holding the first holding tract in correct alignment with the sorter output track 26. In this position, with no compressed air supplied to either pneumatic actuator, the output arm of pneumatic actuator 44 is retracted halfway. To feed nails to the center holding track, compressed air is supplied only to pneumatic actuator 44 which causes its output arm to be fully extended, thereby stretching spring 46 and aligning the center holding track with the sorter output track 26. With compressed air supplied only to pneumatic actuator 44, pneumatic actuator 42 remains in the fully retracted position. When compressed air is supplied to pneumatic actuator 42, its output arm is fully extended and the third holding track is positioned in alignment with the sorter output track 26.

Although the present embodiment uses a tension spring as the biasing means, other means for biasing the position of the holding tracks such as compression springs or weights would be equally suitable. Other means for positioning the holding tracks 28 in alignment with the sorter output track 26 are also within the scope of the invention. Such means might include hydraulic, pneumatic, or electrical actuators, stepping motors, or extending screw actuators. Such devices, although not illustrated, may be more or less desirable depending upon such factors as the number of holding tracks to be red, the availability of electrical or pneumatic power, etc. With some such devices, where the output arm may be driven to multiple positions in both the extending and retracting directions the output arm of the actuator may be connected directly to the holding tracks, thereby eliminating the necessity for biasing means such as spring 46.

Referring now to FIG. 3, a quantity of nails 48 can be seen suspended by their heads on holding track 28. As the nail arrives at the output end of the holding track 28, it is temporarily held in position by a first magnet 50. This prevents further nails from sliding off the end of the holding track 28. Located above the nail held by magnet 50 is a plunger 52 mounted on a slide block 54 sliding on tubular guides 56.

Slide block 54 is connected to the output arm of pneumatic actuator 58. At a signal, compressed air is fed into pneumatic actuator 58 extending its output arm and forcing the slide block 54 and plungers 52 downward, dislodging the nail held by magnet 50 so that it slides into the ready position in nail holding chamber 60. Nail holding chamber 60 is formed within mounting member 32.

With the output arm of the pneumatic actuator 58 fully extended, the plunger 52 prevents the next nail in sequence on the holding track 28 from sliding into position against magnet 50. Pneumatic actuator 48 differs from pneumatic actuators 42 and 44 in that compressed air can be used to retract the output arm as well as extend it. When compressed air is fed into pneumatic actuator 58 to retract the output arm, plunger 52 is lifted, and the next nail in sequence slides into position against magnet 50.

As can be seen in FIG. 2, there is only a single pneumatic actuator 58 which operates all of the plungers 52 in a single stroke. This is the preferred embodiment and is preferable where the automatic nailers being fed are to operate simultaneously. This is the type of operation found, for example, in the construction of wooden pallets where each board is simultaneously nailed at a number of fixed points. Although not shown in the drawings, it is also within the scope of this invention to have a separate pneumatic actuator independently driving each plunger, which enables the nailers to operate completely independently.

A second magnet 62 is located adjacent to the nail holding chamber to capture the nail after it is released from the first magnet 50 and to hold it in the ready position. All parts which come in close proximity to nails or magnets are constructed of non-magnetic materials so as to avoid interfering with the proper operation of the feeder. A pneumatic transfer tube 64 is mounted below the nail holding chamber. An air delivery channel 66 is connected between the nail holding chamber 60 and an air plenum 68. When the plenum 68 is pressurized, a blast of air flows down the air delivery channel 66 and forces the nail held by magnet 62 down the pneumatic transfer tube 64 to its respective nailing machine.

Plenum 68 in the preferred embodiment is common to all of the nail holding chambers 60. This is consistent with the design for simultaneous operation of the nailers. Individual plenums may also be used to allow nails to be fed as required to nailing machines operating independently.

Referring to FIG. 4, three lower nail sensors 70 can be seen mounted benath and adjacent to the holding tracks 28. Three upper nail sensors 72 are also located beneath the holding tracks and can be seen in FIG. 1 and FIG. 7. These sensors signal the presence or absence of nails on the holding tracks to the control unit which operates the pneumatic actuators and sorter to feed the nails as required.

FIG. 5 provides a detailed view of the pivoting operation of the holding tracks 28 and pneumatic actuators 42 and 44. In FIG. 5 pneumatic actuator 44 has fully extended its output arm and the center holding track 28 is being fed.

FIG. 6 shows a detailed view of pneumatic actuators 42 and 44 illustrating how precise adjustment can be obtained by means of a sliding mount 74. A cut away view of pneumatic actuator 44 shows the piston and cylinder construction of this unit. These units are commercially available and may be mounted to operate as the operation of pneumatic actuators 42 and 44 were described where compressed air is used to extend the output arm, and a biasing means is used to retract it, or they may be installed to operate as the operation of pneumatic actuator 58 was described where compressed air can be fed to either side of the internal piston, thereby allowing the output arm to be fully extended or fully retracted as desired.

FIG. 7 shows a block diagram of the pneumatic and electric control system used to operate the nail feeder. Considering initially the operation of a single nail holding track 28, at some point in time as nails are used from the track, lower nail sensor 70 will begin to sense the absence of nails on that track. In the preferred embodiment, nail sensors 70 and 72 are magnetically operated switches, however, other sensors known in the art would be equally suitable. The absence of nails at the point where lower nail sensor 70 is mounted is signaled to the electronic control unit 76.

Electronic control unit 76 first checks to see that none of the other holding tracks are being fed and then actuates the appropriate electrically operated pneumatic valve 78 or 80. Compressed air from plenum 82 flows through the appropriate pneumatic valve 78 or 80 to actuate the proper pneumatic actuator 42 or 44, and correctly position the appropriate nail holding track 28 in alignment with the sorter output track 26.

With tracks properly in alignment, the electronic control 76 opens pneumatic valve 84 and the vibrator under the sorter 10 until the upper nail sensor 72 senses the presence of nails. The vibrator is then turned off. Electronic control 76 is designed to ignore the short duration signals produced as nails slide past the upper nail sensor 72, and only turns the vibrator off when the nail holding track is actually full of nails as determined by the presence of a sustained signal from the upper nail sensor 72.

Pneumatic valves 86 and 88 are used to extend and retract the output arm of pneumatic actuator 58, and thereby operate plungers 52 as previously described. Although a single actuator 58 is shown in FIG. 7 two additional actuators could be easily provided by one skilled in the art to allow plungers 52 to the independently operated. This would permit the nailers being fed to operate at different times and at different rates. Pneumatic valve 90 is operated by the electronic control 76 to supply air to the plenum 68 and drive the nails from the ready position down the pneumatic transfer tube 64 to the appropriate nailer. A needle valve 92 is provided to adjust the flow rate of this compressed air so that the nail is supplied by the pneumatic transfer tube 64 at the appropriate speed. The timing of the operation of pneumatic actuator 58 and pneumatic valve 90 can be supplied by an automatic timer within electronic control 76, or upon demand as sensed by sensors 94 attached to each nailer. Individual sensors 94 are especially suitable for use when it is desired to have the nailers operating independently as described above.

The design of timing and control circuitry within the electronic control unit 76 is easily accomplished by one skilled in the electronic arts. Pressure regulators 96 are strategically located through the pneumatic system to adjust pressures for operating the various actuators and valves.

From the foregoing disclosure taken in conjunction with the accompanying drawings, it will be readily apparent to those skilled in the art that this invention affords a novel construction for an apparatus for feeding loose fasteners to a plurality of fastening machines, and that it particularly provides a convenient means for supplying nails to a plurality of automatic nailing machines.

Although our invention has been illustrated and described with references to the preferred embodiment thereof, we wish to have it understood that it is in no way limited to the details of such embodiments but is capable of numerous modifications within the scope of the appended claims.

Having thus fully disclosed our invention, what we claim is:

1. An apparatus for feeding loose fasteners from a sorter having one output guideway to a plurality of fastening machines comprising:
   a plurality of holding guideways having an input end and an output end for holding a quantity of fasteners to be sequentially fed to each fastening machine, the input end of the holding guideways being moveable with respect to the output guideway of the sorter;
   guideway positioning means for positioning the input end of each holding guideway in communication with the output guideway of the sorter to enable fasteners to be fed into each holding guideway;
   control means for controlling the guideway positioning means;
   means for sensing the presence or absence of fasteners on each holding guideway connected to the control means, the control means responding to the sensed absence of fasteners on one of the holding guideways by positioning the input end of said one of the holding guideways in communication with the output guideway of the sorter;
   a first retaining means for temporarily holding each fastener as it arrives at the output end of each holding guideway; and
   means for transferring each fastener from the first retaining means to its respective fastening machine.

2. An apparatus for feeding loose fasteners to a plurality of fastening machines as recited in claim 1, wherein the guideway positioning means comprises at least one pneumatic actuator and a biasing means.

3. An apparatus for feeding loose fasteners to a plurality of fastening machines as recited in claim 2, wherein the guideway positioning means comprises two pneumatic actuators, the biasing means comprises a spring, and the plurality of holding guideways comprises exactly three holding guideways.

4. An apparatus for feeding loose fasteners to a plurality of fastening machines as recited in claim 1, wherein the first retaining means comprises a magnet and wherein all components of the apparatus in the vicinity of the magnet are constructed of non-magnetic materials.

5. An apparatus for feeding loose fasteners to a plurality of fastening machines as recited in claim 1, wherein the means for transferring each fastener from the first retaining means to its respective fastening machine comprises:
   a plunger;
   a plunger actuator for moving the plunger so as to release the fastener from the first retaining means;
   a second retaining means for temporarily holding each fastener in a ready position after it is released from the first retaining means; and
   means for moving each fastener from the ready position to its respective fastening machine.

6. An apparatus for feeding loose fasteners to a plurality of fastening machines as recited in claim 5, wherein the plunger actuator comprises a pneumatic actuator.

7. An apparatus for feeding loose fasteners to a plurality of fastening machines as recited in claim 5, wherein the first and second retaining means comprise magnets and wherein all components of the apparatus in the vicinity of the magnets are constructed of non-magnetic materials.

8. An apparatus for feeding loose fasteners to a plurality of fastening machines as recited in claim 5, wherein the means for moving each fastener from the ready position to its respective fastening machine comprises:
   a pneumatic transfer tube; and
   means for supplying compressed air to move the fastener from the ready position down the pneumatic transfer tube to its respective fastening machine.

9. An apparatus for feeding loose fasteners to a plurality of fastening machines as recited in claim 5, further comprising:
   control means for controlling the operation of the sorter, the guideway positioning means, the plunger actuator and the means for moving each fastener from the ready position to its respective fastening machine; and
   means for sensing the presence or absence of fasteners on the holding guideway connected to the control means.

10. An apparatus for feeding loose fasteners to a plurality of fastening machines as recited in claim 9, wherein the sensors comprise magnetically operated switches.

11. An apparatus for feeding loose fasteners to a plurality of fastening machines as recited in claim 9, wherein the means for sensing the presence or absence of fasteners on the holding guideway comprises:
   an upper sensor for sensing when the holding guideway is full of fasteners; and,
   a lower sensor for sensing when the supply of fasteners on the holding guideway is depleted.

12. An apparatus for feeding loose fasteners to a plurality of fastening machines are recited in claim 9, wherein the control means comprises a timer for automatically operating the plunger actuator and the means for moving each fastener from the ready position to its respective fastening machine.

13. An apparatus for feeding loose fasteners to a plurality of fastening machines as recited in claim 9, further comprising a fastening machine sensor mounted on the fastening machine and connected to the control means for sensing when the fastening machine has operated.

14. A nail feeder for feeding loose nails to a plurality of nailing machines comprising:
- a sorter having an input hopper and an output track for sorting the loose nails from a randomly oriented state in the hopper to a uniformly oriented state on the output track;
- a plurality of holding tracks having an input end and an output end for holding a quantity of nails to be fed to each nailing machine;
- a mounting member pivotally mounted for mounting the holding tracks in such a manner as to allow the input end of each holding track to be aligned with the output track of the sorter as the mounting member is pivoted;
- at least one pneumatic actuator for pivoting the mounting member and positioning the input end of each holding track in alignment with the output track of the sorter to enable nails to be fed into each holding track;
- a first magnet positioned adjacent to the output of each holding track for temporarily holding each nail at the output end of the holding track as the nail arrives at that location;
- a plunger slideably mounted above the output end of each holding track and positioned above the nail being temporarily held by the first magnet;
- a nail holding chamber in communication with the output of each holding track for receiving each nail as it leaves the output end of the holding track;
- a second magnet positioned adjacent to the nail holding chamber for temporarily holding each nail as it arrives in the chamber;
- at least one additional pneumatic actuator for forcing the plunger down into contact with the nail held by the first magnet thereby dislodging it and urging it into the nail holding chamber where it is held by the second magnet;
- a pneumatic transfer tube in communication with the nail holding chamber and the nailing machine for transferring the nail from the holding chamber to the nailing machine;
- at least one sensor mounted on the holding track for sensing the presence or absence of nails in the track; and
- a control unit connected to the sensor for controlling the position of each holding track and filling the track with nails.

15. A nail feeder as recited in claim 14 comprising two pneumatic actuators for pivoting the mounting member.

16. A nail feeder as recited in claim 14 comprising:
- an upper nail sensor connected to the control unit for sensing when the holding track is full of nails; and
- a lower nail sensor connected to the control unit for sensing when the supply of nails on the holding track is depleted.

17. A nail feeder as recited in claim 16, wherein the nail sensors comprise magnetically operated switches.

18. A nail feeder as recited in claim 14 wherein all components of the nail feeder in the vicinity of the first and second magnets are constructed of non-magnetic materials.

* * * * *